US008774400B2

(12) United States Patent
Boscher et al.

(10) Patent No.: US 8,774,400 B2
(45) Date of Patent: Jul. 8, 2014

(54) METHOD FOR PROTECTING DATA AGAINST DIFFERNTIAL FAULT ANALYSIS INVOLVED IN RIVEST, SHAMIR, AND ADLEMAN CRYPTOGRAPHY USING THE CHINESE REMAINDER THEOREM

(75) Inventors: Arnaud Boscher, Puteaux (FR); Elena Vasilievna Trichina, Munich (DE); Helena Handschuh, Paris (FR)

(73) Assignee: Spansion LLC, Sunnyvale, CA (US)

( * ) Notice: Subject to any disclaimer, the term of this patent is extended or adjusted under 35 U.S.C. 154(b) by 744 days.

(21) Appl. No.: 11/969,106

(22) Filed: Jan. 3, 2008

(65) Prior Publication Data
US 2009/0175441 A1 Jul. 9, 2009

(51) Int. Cl.
H04K 1/00 (2006.01)
(52) U.S. Cl.
USPC .......................................................... 380/30
(58) Field of Classification Search
USPC ............................................... 380/1, 30
See application file for complete search history.

(56) References Cited

U.S. PATENT DOCUMENTS

| 6,256,656 | B1 * | 7/2001 | Gossett et al. | 708/650 |
|---|---|---|---|---|
| 7,359,508 | B2 | 4/2008 | Villegas et al. | |
| 7,580,966 | B2 * | 8/2009 | Le Quere | 708/491 |
| 2002/0041683 | A1 * | 4/2002 | Hopkins et al. | 380/28 |
| 2002/0110241 | A1 * | 8/2002 | Chen et al. | 380/44 |
| 2004/0148325 | A1 * | 7/2004 | Endo et al. | 708/492 |
| 2004/0208317 | A1 * | 10/2004 | Imai et al. | 380/44 |
| 2004/0260931 | A1 * | 12/2004 | Fischer et al. | 713/176 |
| 2008/0056489 | A1 * | 3/2008 | Liardet et al. | 380/30 |

FOREIGN PATENT DOCUMENTS

| WO | WO9852319 | 11/1998 |
|---|---|---|
| WO | WO2006103341 | 10/2006 |

OTHER PUBLICATIONS

Demillo D. Boneh, et al. "On the Importance of Checking Cryptographic Protocols for Faults" Math and Cryptography Research Group, Bellcore, 445 South Street, Morristown NJ 07960. 15 pages.
Joye M. Ciet. "Practical Fault Countermeasures for Chinese Remaindering Based RSA". Gemplus and CIM-PACA, Gardanne France. FDTC '05. 18 pages.
Christophe Giraud. "Fault resistant RSA Implementation". Oberthur Card Systems. FDTC '05. 88 pages.
Johannes Blomer, et al. "A new CRT-RSA algorithm secure against bellcore attacks". ACM conference on Computer and Communications Security. 10 pages.

(Continued)

Primary Examiner — Krista Zele
Assistant Examiner — Esther Benoit
(74) Attorney, Agent, or Firm — Amin, Turocy & Watson, LLP

(57) ABSTRACT

Systems and methods for effectively protecting data against differential fault analysis involved in Rivest, Shamir, and Adleman ("RSA") cryptography using the Chinese Remainder Theorem ("CRT") are described herein. A CRT RSA component facilitates modular exponentiation of a received message, and a verification component reconstructs the received message. An exponentiation component performs a first modular exponentiation and a second modular exponentiation of the received message. A recombination component performs a recombination step utilizing CRT computation as a function of the first and second modular exponentiations. A modular exponentiation component performs first and second public exponent derivations as a function of a private exponent. The verification component can reconstructs the received message as a function of the first and second public exponent derivations. The verification component calculates the received message utilizing Chinese Remainder Theorem computation.

20 Claims, 14 Drawing Sheets

(56) References Cited

OTHER PUBLICATIONS

Beir C. Aumuller, et al. "Fault attacks on RSA with CRT: Concrete Results and practical Countermeasures". Infineon Technologies. Security and Chipcard ICs. CC TI Concepts and Innovations. Munich, Germany, 2003. 15 pages.

Taiwanese Examination Report mailed Jan. 28, 2014 for Taiwanese Patent Application 97151171, 8 pages.

Boscher, et al. "CRT RSA Algorithm Protected Against Fault Attacks." Published in Information Security Theory and Practices. Smart Cards, Mobile and Ubiquitous Computing Systems. [Lecture Notes in Computer Science; LNCS], May 9, 2007. pp. 229-243.

Christophe Giraud. "An RSA Implementation Resistant to Fault Attacks and to Simple Power Analysis." IEEE Transactions on Computers, vol. 55, No. 9. Sep. 2006. pp. 1116-1120.

International Search Report mailed Jun. 17, 2009 for PCT Application PCT/US2008/088658, 3 pages.

\* cited by examiner

METHOD FOR PROTECTING DATA AGAINST DIFFERNTIAL FAULT ANALYSIS INVOLVED IN RIVEST, SHAMIR, AND ADLEMAN CRYPTOGRAPHY USING THE CHINESE REMAINDER THEOREM

TECHNICAL FIELD

This disclosure relates generally to systems and methods that facilitate securing information and in particular, but not exclusively, relates to systems and methods for protecting data against differential fault analysis involved in Rivest, Shamir, and Adleman cryptography using the Chinese Remainder Theorem.

BACKGROUND

Electronic communication of information has become commonplace. Today, sensitive information regarding individuals, businesses, and other entities, can be communicated electronically between devices. For example, computers, cellular phones, smart cards, and other electronic devices can be utilized to electronically communicate such information between users. Further, devices (e.g., smart cards) can be utilized to provide a digital signature or other authentication information that can reasonably identify a user of such devices and can provide certain information regarding the user and/or can enable the user to sign electronic documents (e.g., legal documents) in a secure manner.

With regard to the electronic communication of sensitive information, encryption/decryption techniques can be utilized to protect such information from being accessed by undesired persons (e.g., attackers, hackers). For example, public key encryption can be utilized to secure information electronically communicated between devices. When sending a message, an entity can utilize a public key, which can be published and made available to users, to encrypt the message data. The encrypted message can be sent to a recipient, who can utilize a private key, which can be known to the recipient but not others, so that the encrypted message data can be decrypted and the message can be perceived in a usable form. Conventional technology commonly utilizes Rivest, Shamir, and Adleman ("RSA") cryptography to perform such public key encryption. Further, when public key encryption is implemented on embedded devices, conventional technology utilizes the Chinese Remainder Theorem ("CRT") with RSA cryptography ("CRT RSA cryptography") for signing or decryption operations (i.e., operations involving the private key).

However, undesired persons can take measures to attempt to learn or decrypt secure data and/or the private key that was used to encrypt the secure data. For example, attackers can attempt to collect side-channel information (e.g., power consumption information, electromagnetic information, or fault information) associated with a device when executing a cryptographic process in order to learn the private key or other security measures utilized to secure the data. Attacks using such side-channel information can include simple power analysis ("SPA") attacks, differential power analysis ("DPA") attacks, electromagnetic analysis ("EMA") attacks, and differential fault analysis ("DFA") attacks.

Specifically, an attacker can utilize DFA to attack CRT RSA cryptography implemented on an embedded device, provoking an abnormal computation and using a corrupted result to find a private key. Although conventional methods can be used to prevent such attacks, they are time consuming (e.g., by computing a digital signature multiple times) and can be ineffective (e.g., when an attacker provokes abnormal computations by injecting a common error during multiple device executions of the cryptographic process, or when a public exponent is unknown). Thus, conventional techniques are inadequate in preventing DFA attacks on CRT RSA cryptography implemented on embedded devices, allowing undesired persons to gain unauthorized and undesired access to a user's information. Such access can cause undesired financial hardship, emotional hardship, and/or other harm to the user.

It is therefore desirable to prevent DFA attacks on CRT RSA cryptography utilized to protect sensitive information communicated between electronic devices. Further, it is desirable that such countermeasures be manageable on electronic devices, including portable electronic devices (e.g., cellular phones, smart cards).

SUMMARY

The claimed subject matter relates to systems and methods for effectively preventing differential fault analysis ("DFA") attacks on Chinese Remainder Theorem ("CRT") Rivest, Shamir, and Adleman ("RSA") cryptography utilized to protect sensitive information communicated between electronic devices. Conventional techniques used to prevent such attacks are time consuming and can be ineffective, thus allowing undesired persons to gain unauthorized and undesired access to a user's information. Compared to conventional techniques, the novel systems and methods of the claimed subject matter effectively prevent DFA attacks on CRT RSA cryptography of information by performing modular exponentiation utilizing composites of a private key and reconstructing an original message as a function of the modular exponentiation.

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject invention provides systems and methods for protecting sensitive information communicated between electronic devices. In accordance with one aspect of the disclosed subject matter, a CRT RSA component can facilitate modular exponentiation of a received message and a verification component can reconstruct the received message. In accordance with another aspect of the disclosed subject matter, the CRT RSA component can include an exponentiation component that can perform a first and second modular exponentiation of the received message. Further, the CRT RSA component can include a recombination component that can perform a recombination step utilizing CRT computation as a function of the first and second modular exponentiations.

In accordance with yet another aspect of the disclosed subject matter, a modular exponentiation component can perform a first and second public exponent derivation as a function of a private exponent. Further, the verification component can reconstruct the received message as a function of the first public exponent derivation and the second public exponent derivation. This verification component can also reconstruct the received message as a function of an original public exponent, instead of using the first public exponent derivation and the second public exponent derivation. In accordance with one aspect of the disclosed subject matter, the verification component can calculate the received message utilizing CRT computation. In accordance with another aspect of the disclosed subject matter, the verification component can perform a first modular exponentiation and determine whether the first modular exponentiation is equivalent to an exponentiation of the first public exponent derivation.

Further, the verification component can perform a second modular exponentiation and determine whether the second modular exponentiation is equivalent to an exponentiation of the second public exponent derivation. In accordance with yet another aspect of the disclosed subject matter, the verification component can perform an infective computation. Further, the verification component can perform the infective computation as a function of the received message being equivalent to the reconstructed received message. In one aspect of the disclosed subject matter, the verification component can provide at least one of an output indicating "error" or an output indicating a signature as a function of determining whether the received message is equivalent to the reconstructed received message.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods for effectively protecting data against differential fault analysis involved in Rivest, Shamir, and Adleman ("RSA") cryptography using the Chinese Remainder Theorem ("CRT") are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

The subject invention provides systems and methods that effectively prevent differential fault analysis ("DFA") attacks on CRT RSA cryptography utilized to protect sensitive information communicated between electronic devices. Embodiments of the invention include techniques for performing modular exponentiation utilizing composites of a private key and reconstructing an original message as a function of the modular exponentiation, avoiding the time consuming and ineffective limitations of conventional techniques.

Figure 1:
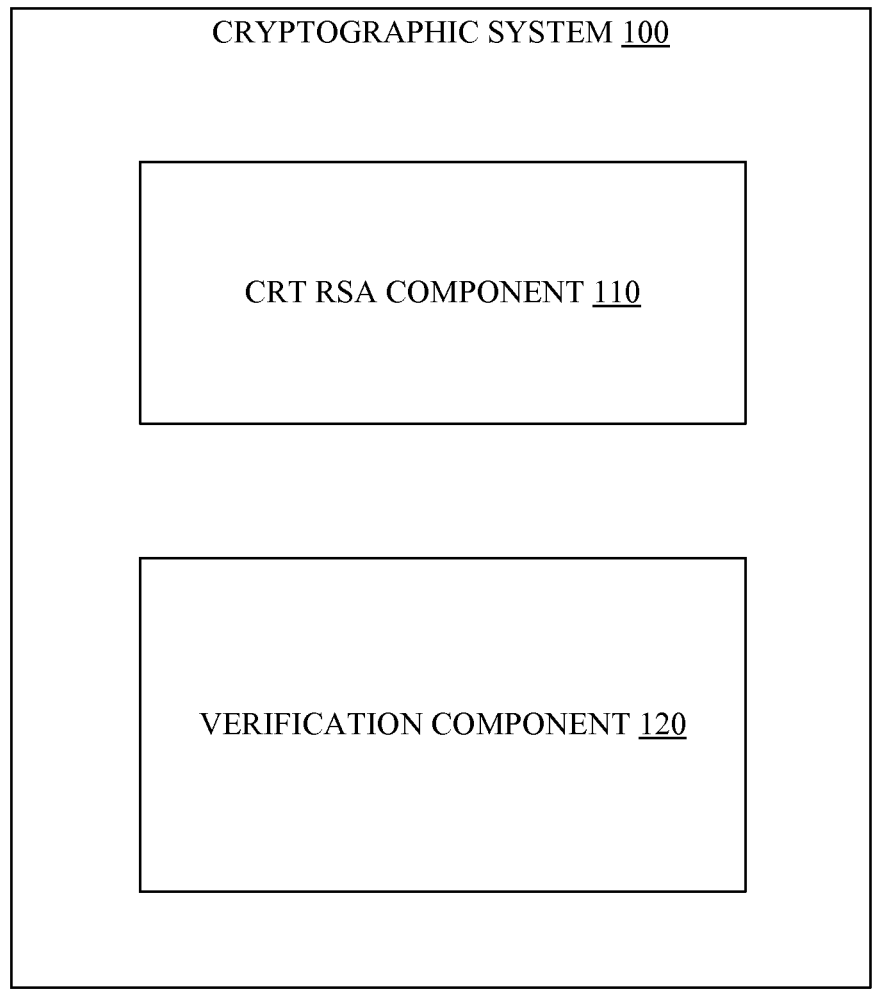
FIG. 1 is a demonstrative cryptographic system for protecting sensitive information communicated between electronic devices, in accordance with an embodiment of the invention.

FIG. 1 is a demonstrative cryptographic system 100 for protecting sensitive information communicated between electronic devices, in accordance with an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit ("ASIC") or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

In cryptographic system 100, a CRT RSA component 110 can facilitate modular exponentiation of a received message. Further, verification component 120 can verify whether a received message is equivalent to the reconstructed received message by applying CRT calculations on the reconstructed received message. Thus, the subject invention avoids limitations of conventional CRT RSA methods and systems by performing modular exponentiation, imitating a public key by utilizing composites of a private key, and reconstructing an original message as a function of the modular exponentiation.

Figure 2:
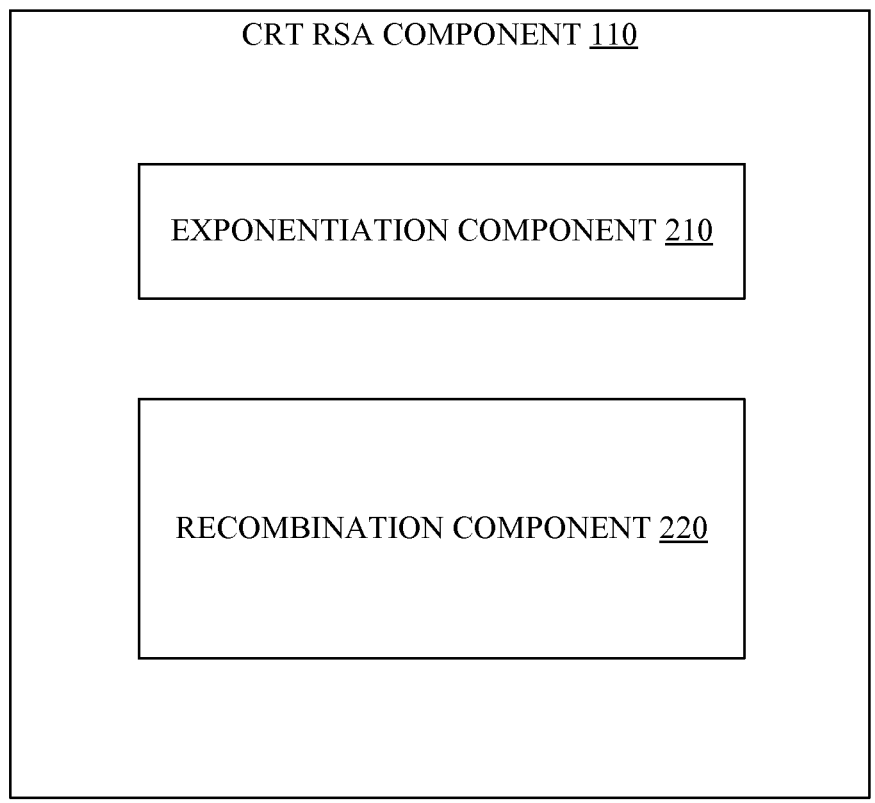
FIG. 2 is a demonstrative CRT RSA component of a cryptographic system that protects sensitive information communicated between electronic devices, in accordance with an embodiment of the invention.

FIG. 2 is a demonstrative CRT RSA component 110 of a cryptographic system that protects sensitive information communicated between electronic devices, in accordance with an embodiment of the invention. CRT RSA component 110 can include an exponentiation component 210 and a recombination component 220. Exponentiation component 210 can perform a first modular exponentiation and a second modular exponentiation of the received message. Recombination component 220 can perform a recombination step utilizing CRT computation as a function of the first and second modular exponentiations.

Figure 3:
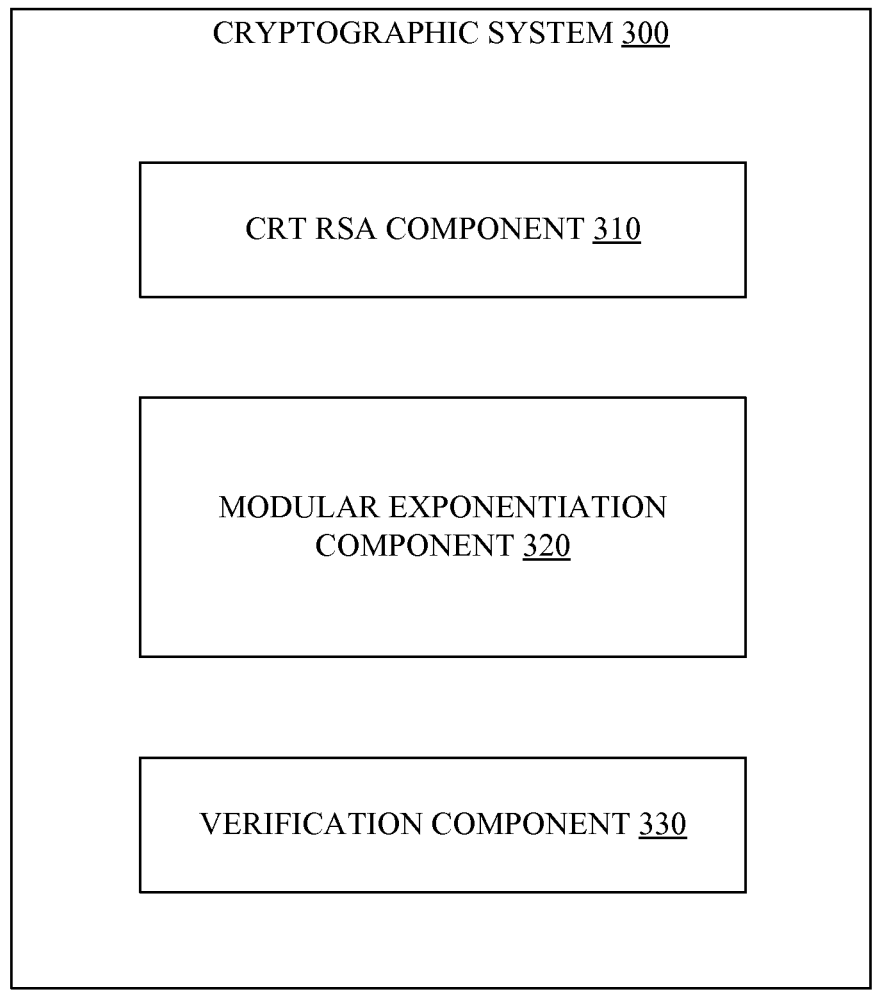
FIG. 3 is a demonstrative cryptographic system for protecting sensitive information communicated between electronic devices that includes a modular exponentiation component, in accordance with an embodiment of the invention.

FIG. 3 is a demonstrative cryptographic system 300 for protecting sensitive information communicated between electronic devices that includes a modular exponentiation component 320, in accordance with an embodiment of the invention. Modular exponentiation component 320 can perform a first public exponent derivation and a second public exponent derivation as a function of a private exponent. These public exponent derivations can be used by verification component 330, which can reconstruct the received message as a function of the first and second public exponent derivations. Thus, verification component 330 can reconstruct the received message by imitating a public key as a function of composites of a private key, avoiding limitations of conventional CRT RSA methods and systems.

Figure 4:
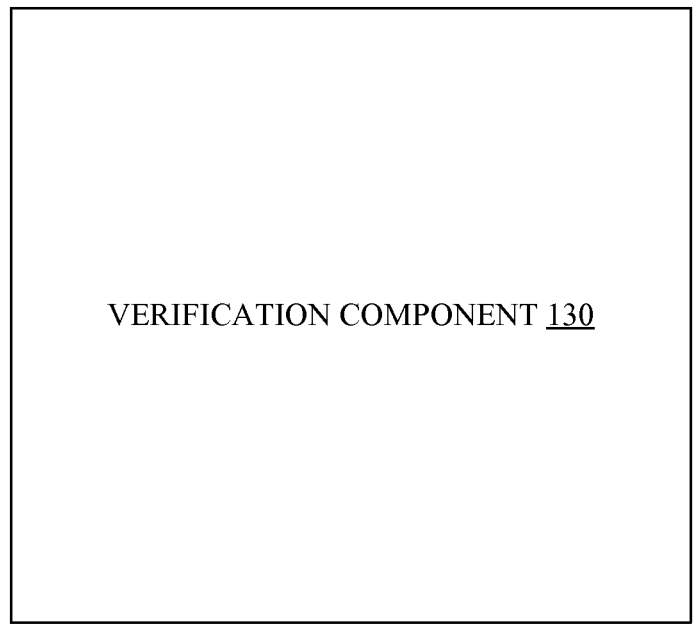
FIG. 4 is a demonstrative verification component of a cryptographic system that protects sensitive information communicated between electronic devices, in accordance with an embodiment of the invention.

FIG. 4 illustrates a verification component 120 of a cryptographic system that protects sensitive information communicated between electronic devices, in accordance with an embodiment of the invention. As described above, verification component 120 can reconstruct the received message. In one embodiment, verification component 120 can calculate a received message utilizing CRT computation. Further, verification component 120 can determine whether a first modular exponentiation is equivalent to an exponentiation of a first public exponent derivation. In another embodiment, verification component 120 can determine whether a second modular exponentiation is equivalent to an exponentiation of a second public exponent derivation. In yet another embodiment, verification component 120 can perform an infective computation to make an attacker's DFA greatest common devisor computation ineffective. In one embodiment, verification component 120 can perform an infective computation as a function of determining whether a received message is equivalent to a reconstructed received message.

Figure 5:
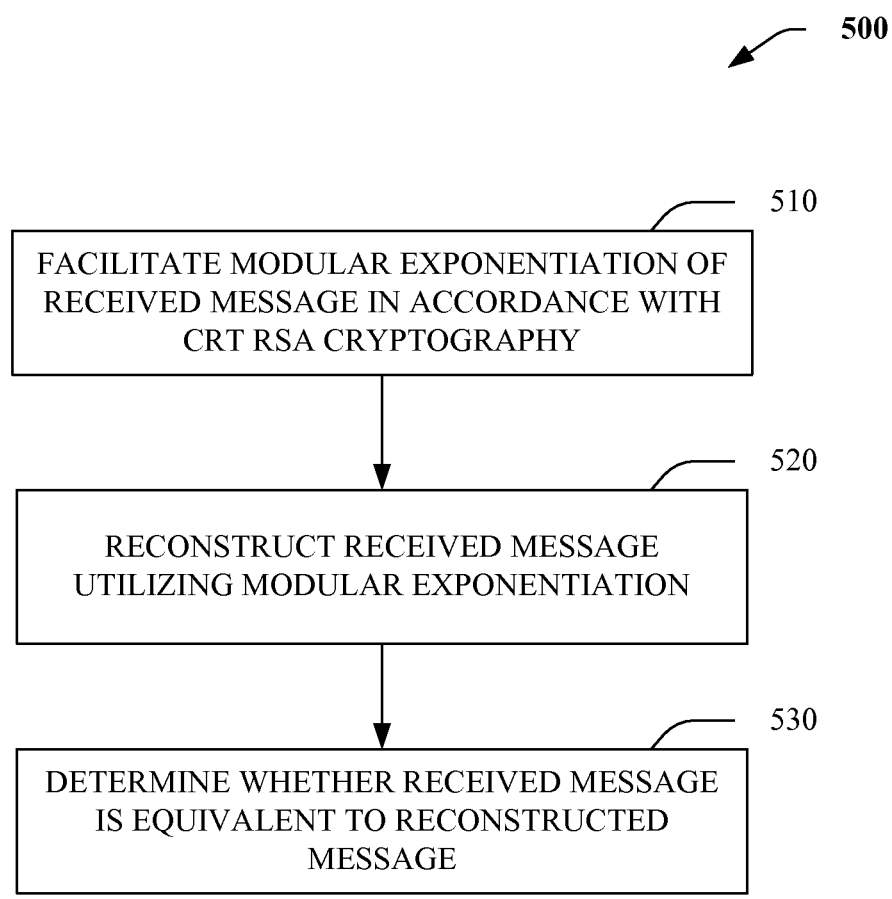
FIG. 5 illustrates a methodology for protecting sensitive information communicated between electronic devices, in accordance with an embodiment of the invention.
Figure 6:
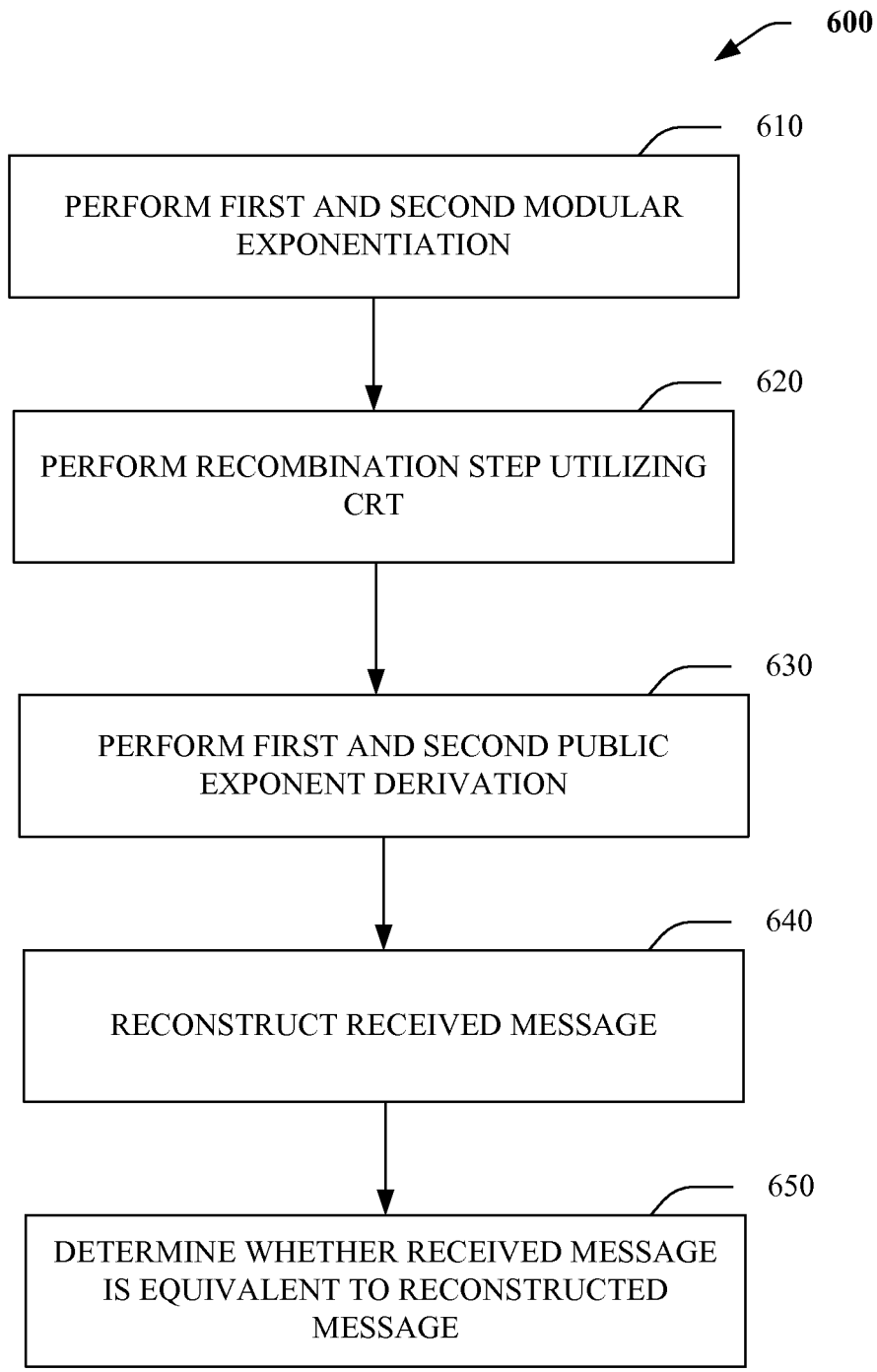
FIG. 6 illustrates another methodology for protecting sensitive information communicated between electronic devices, in accordance with an embodiment of the invention.

FIG. 5 illustrates a methodology for protecting sensitive information communicated between electronic devices, in accordance with an embodiment of the invention. At 510, a modular exponentiation of a received message in accordance with CRT RSA cryptography can be facilitated. The received message can be reconstructed at 520. At 530, it can be determined whether the received message is equivalent to the reconstructed received message at 520. FIG. 6 illustrates another methodology for protecting sensitive information communicated between electronic devices, in accordance with an embodiment of the invention. At 610, a first and second modular exponentiation of a received message can be facilitated, and a recombination step utilizing CRT computation can be performed at 620. At 630, a first and second public exponent derivation can be performed based on a private exponent, and the received message can be reconstructed as a function of the first and second public exponent derivations at 640. It can be determined, at 650, whether the message received is equivalent to the reconstructed received message.

Figure 7:
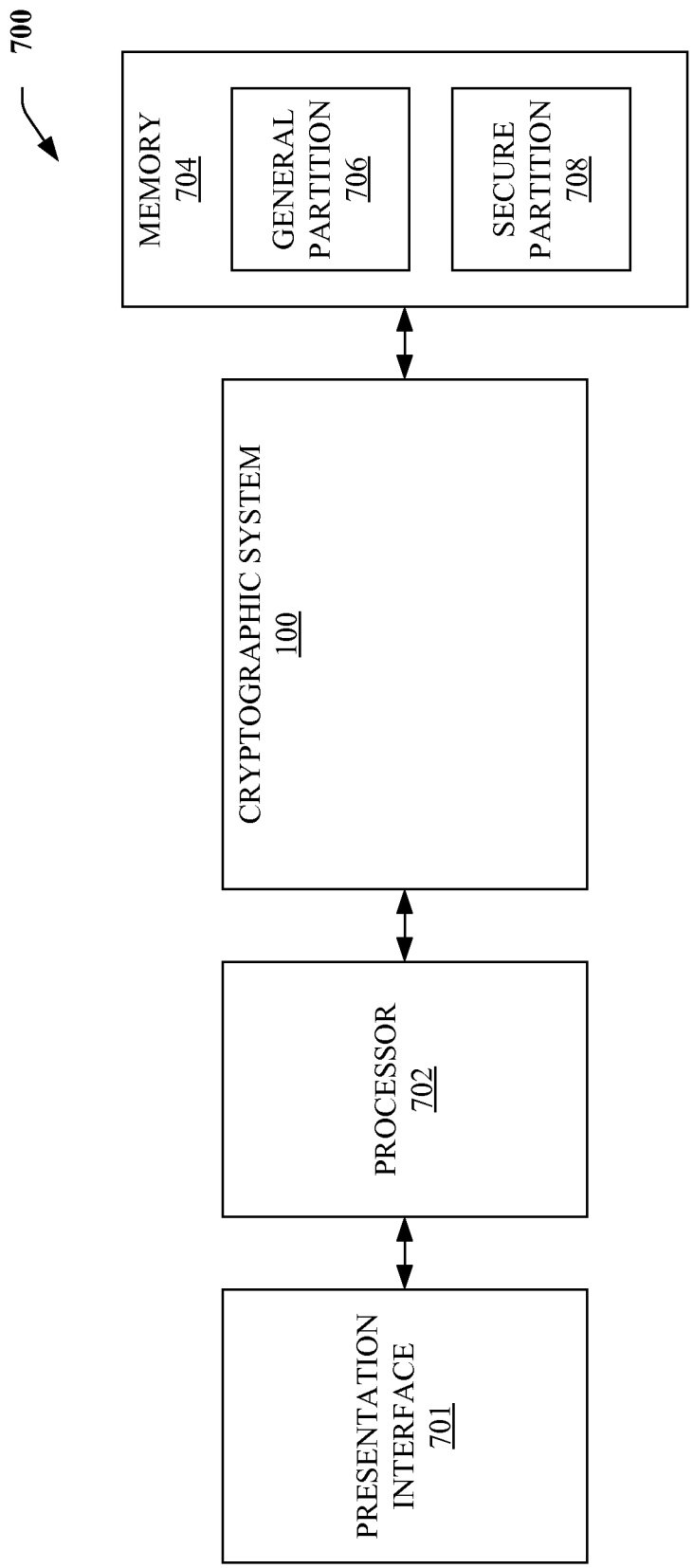
FIG. 7 is a block diagram of a system that protects sensitive information communicated between electronic devices, in accordance with an embodiment of the invention.

FIG. 7 is a block diagram of a system 700 that protects sensitive information communicated between electronic devices, in accordance with an embodiment of the invention. System 700 can include a presentation interface 701 coupled to a host processor 702. Further, system 700 can include a cryptographic system 100 coupled to the host processor 702 and a memory 704. Presentation interface 701 can provide various types of user interfaces to facilitate interaction between a user and any entity coupled to the host processor 702. As depicted, the presentation interface 701 is a separate entity that can be utilized with the host processor 702 and associated entities. However, it is to be appreciated that the presentation interface 701 and/or similar view entities can be incorporated into the host processor 702 and/or a stand-alone unit.

The presentation interface 701 can provide one or more graphical user interfaces ("GUIs"), command line interfaces, and the like. For example, a GUI can be rendered that provides a user with a region or means to load, import, read, etc., data, and can include a region to present the results of such operations. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more entities coupled to and/or incorporated into the host processor 702.

The user can also interact with the regions to select and provide information via various devices such as a mouse, a roller ball, a keypad, a keyboard, a pen and/or voice activation. Typically, a mechanism such as a push button or the enter key on the keyboard can be employed subsequent entering information in order to initiate a search. However, it is to be appreciated that the claimed subject matter is not so limited. For example, merely highlighting a check box can initiate information conveyance. In another example, a command line interface can be employed. For example, the command line interface can prompt the user for information (e.g., via a text message on a display and/or an audio tone). The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Further, the presentation interface 701 can include or can be associated with a scanner that can receive data (e.g., decrypted data, digital signature) from other components (e.g., host processor 702) of system 700. The scanner can be a type whereby a device (e.g., smart card) containing the data can be swiped through the scanner, which can read data associated with the device, and/or the scanner can be a wireless scanner (e.g., radio-frequency identification ("RFID")-type scanner) that can receive or read data associated with a device that contains the data when the device is within a predefined area near the wireless scanner, such that the wireless scanner is able to communicate with the device to read or receive the data from the device.

In accordance with one embodiment of the disclosed subject matter, the host processor 702 can be a typical application processor that can manage communications and run applications. For example, the host processor 702 can be a processor that can be utilized by a computer, a mobile handset, PDA, or other electronic device. In accordance with another embodiment of the disclosed subject matter, the host processor 702 can be a microprocessor (e.g., 16-bit microprocessor) that is of a size such that the host processor 702 can be utilized in a smart card or other small electronic device and can manage electronic communication of information, run applications, and/or process data associated with the smart card or other small electronic device. The host processor 702 can generate commands, including read, write, and/or erase commands, in order to facilitate reading data from, writing data to, and/or erasing data from memory 704.

The cryptographic system 100 can facilitate encrypting data being written to memory 704 and/or decrypting data being read from memory 704, and/or can facilitate generating a digital signature associated with a user(s) and/or data. The memory 704 can facilitate storing data being written to memory 704 and accessing data being read from memory 704. The memory 704 can be partitioned into a desired number of partitions, and, for example, can include a general partition 706 and a secure partition 708. The general partition 706 can store and/or provide data, including data for which general access is desired and computed values (e.g., ep and eq). The secure partition 708 can store data for which a heightened level of security is desired. For example, the secure partition 708 can store information associated with a private key(s) (e.g., secret key or data) of an entity (e.g., user) utilizing the electronic device.

It is to be appreciated that the memory 704 can be, for example, either volatile memory or nonvolatile memory, or can include both volatile and non-volatile memory. By way of illustration, and not limitation, non-volatile memory can include read only memory ("ROM"), programmable ROM ("PROM"), electrically programmable ROM ("EPROM"), electrically erasable programmable ROM ("EEPROM"), or flash memory. Volatile memory can include random access memory ("RAM"), which acts as external cache memory. By way of illustration and not limitation, RAM is available in many forms such as static RAM ("SRAM"), dynamic RAM ("DRAM"), synchronous DRAM ("SDRAM"), double data rate SDRAM ("DDR SDRAM"), enhanced SDRAM ("ESDRAM"), Synchlink DRAM ("SLDRAM"), Rambus direct RAM ("RDRAM"), direct Rambus dynamic RAM ("DRDRAM"), and Rambus dynamic RAM ("RDRAM").

The memory 704 of the subject systems and methods is intended to comprise, without being limited to, these and any other suitable types of memory. In addition, it is to be appreciated that the memory 704 can be a server, a database, a hard drive, and the like. Further, system 100 and/or system 700, or portions thereof, can be employed in virtually any electronic device where security of data is desired. Examples of such electronic devices can include a computer, a cellular phone, a digital phone, a video device (e.g., video playing and/or recording device), a smart card, a personal digital assistant ("PDA"), a television, an electronic game (e.g., video game), a digital camera, an electronic organizer, an audio player and/or recorder, an electronic device associated with digital rights management, Personal Computer Memory Card International Association ("PCMCIA") cards, trusted platform modules ("TPMs"), Hardware Security Modules ("HSMs"), set-top boxes, secure portable tokens, Universal Serial Bus ("USB") tokens, key tokens, secure memory devices with computational capabilities, devices with tamper-resistant chips, and the like.

The aforementioned systems have been described with respect to interaction between several entities and/or components. It should be appreciated that such systems and can include those entities and/or components or sub-components specified therein, some of the specified entities and/or components or sub-components, and/or additional entities and/or components. Sub-components could also be implemented as components communicatively coupled to other components rather than included within parent components. Further, one or more components and/or sub-components may be combined into a single component providing aggregate functionality. The components may also interact with one or more other components not specifically described herein for the sake of brevity, but known by those of skill in the art.

FIGS. 8-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
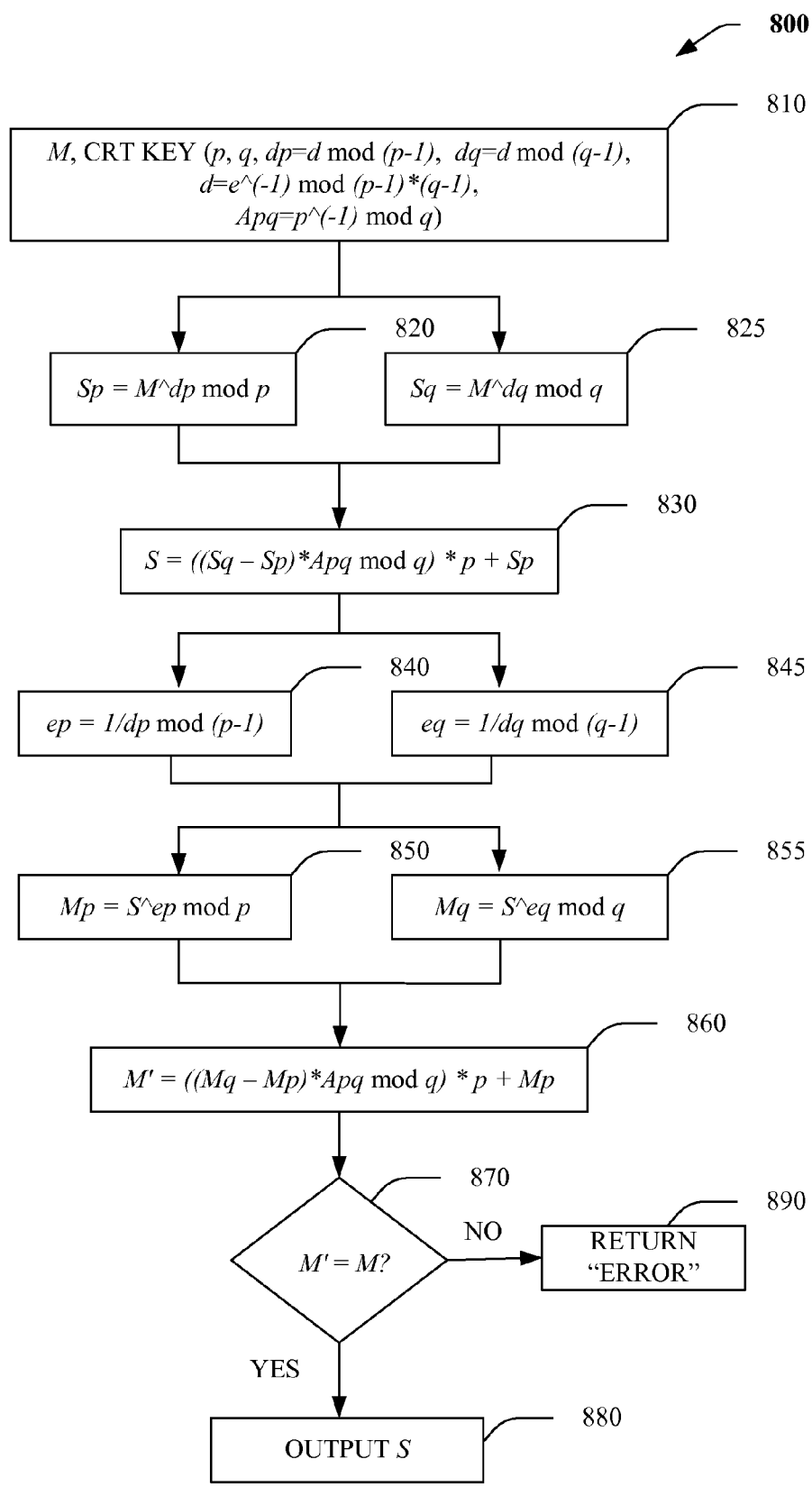
FIG. 8 is a flow chart illustrating computing a received message and comparing the computed received message to the received message to protect sensitive information communicated between electronic device, in accordance with an embodiment of the invention.

FIG. 8 is a flow chart illustrating computing a received message and comparing the computed received message to the received message to protect sensitive information communicated between electronic device, in accordance with an embodiment of the invention. At 810, a message M (e.g., in the form of binary data) and a CRT key can be input. The CRT key can include variables such as p, q, dp=d mod(p−1), dq=d mod(q−1), d=e^(−1)mod(p−1)*(q−1), and Apq=p^(−1) mod q. At 820, variable Sp can be calculated as Sp=M^dp mod p. At 825, variable Sq can be calculated as Sq=M^dq mod q. At 830, variable S can be calculated as S=((Sq−Sp)*Apq mod q)*p+Sp. At 840, variable ep can be calculated as ep=1/dp mod(p−1).

At 845, variable eq can be calculated as eq=1/dq mod(q−1). At 850, variable Mp can be calculated as Mp=S^ep mod p. At 855, variable Mq can be calculated as Mq=S^eq mod q. At 860, variable M' can be calculated as M'=((Mq−Mp)*Apq mod q)*p+Mp. At 870, a determination can be made as to whether M is equivalent to M'. If M is equivalent to M', then the value for S can be provided as an output at 880. If, however, it is determined at 870 that M is not equivalent to M', then an "error" can be provided as an output at 890, in which the "error" can indicate that there was a fault in the exponentiation of the message data.

Figure 9:
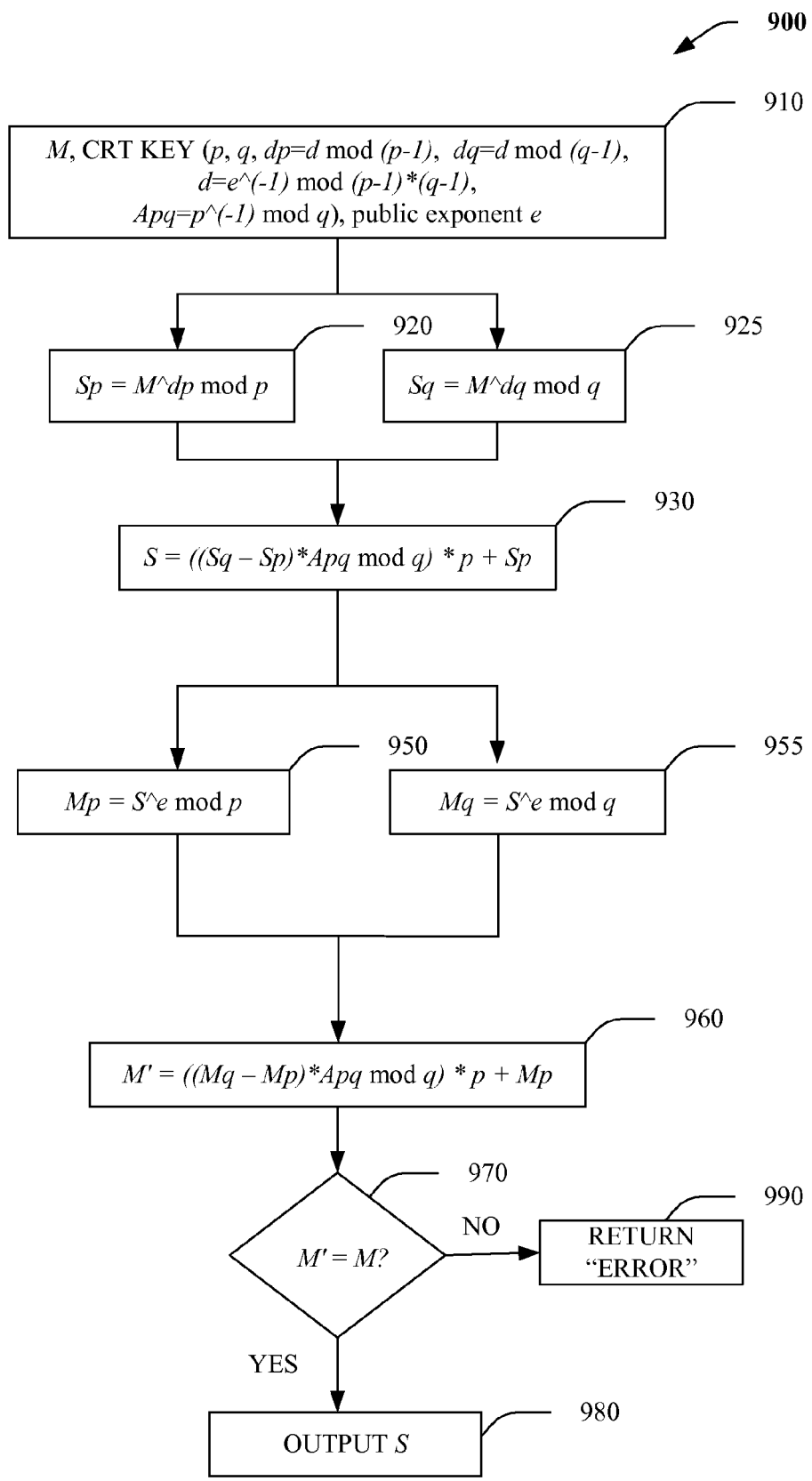
FIG. 9 is a flow chart illustrating computing a received message utilizing a public exponent to protect sensitive information communicated between electronic devices, in accordance with an embodiment of the invention.

FIG. 9 is a flow chart illustrating computing a received message utilizing a public exponent to protect sensitive information communicated between electronic devices, in accordance with an embodiment of the invention. At 910, a message M (e.g., in the form of binary data) and a CRT key can be input. The CRT key can include variables such as p, q, dp=d mod(p−1), dq=d mod(q−1), d=e^(−1)mod(p−1)*(q−1), and Apq=p^(−1)mod q. Further, the CRT key can include public exponent e. At 920, variable Sp can be calculated as Sp=M^dp mod p. At 925, variable Sq can be calculated as Sq=M^dq mod q. At 930, variable S can be calculated as S=((Sq−Sp)*Apq mod q)*p+Sp. At 950, variable Mp can be calculated as Mp=S^e mod p. At 955, variable Mq can be calculated as Mq=S^e mod q. At 960, variable M' can be calculated as M'=((Mq−Mp)*Apq mod q)*p+Mp. At 970, a determination can be made as to whether M is equivalent to M'. If M is equivalent to M', then the value for S can be provided as an output at 980. If, however, it is determined at 970 that M is not equivalent to M', then an "error" can be provided as an output at 990, in which the "error" can indicate that there was a fault in the exponentiation of the message data.

Figure 10:
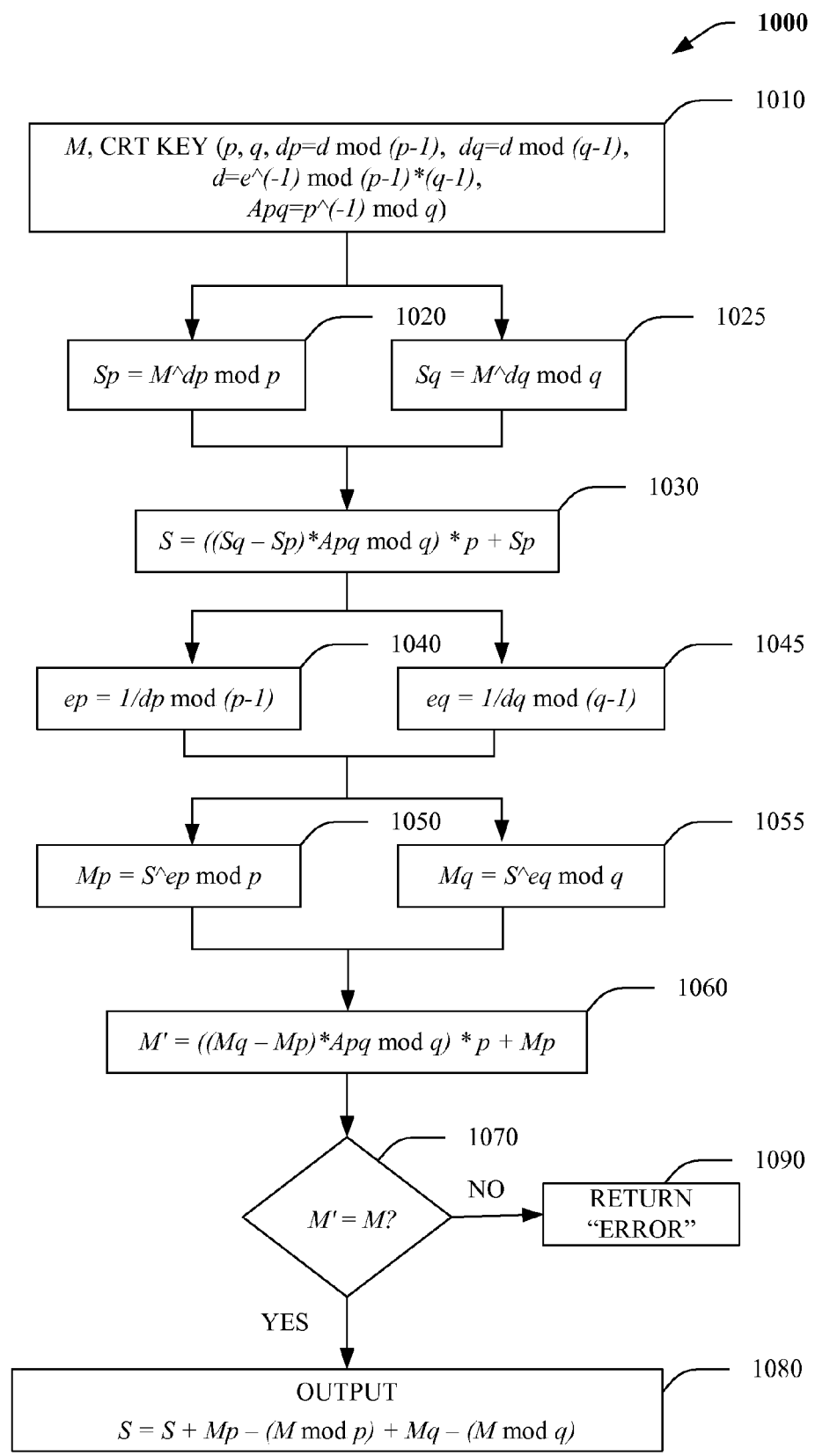
FIG. 10 is a flow chart illustrating performing an infective computation after comparing a computed received message to a received message to protect sensitive information communicated between electronic devices, in accordance with an embodiment of the invention.

FIG. 10 is a flow chart illustrating performing an infective computation after comparing a computed received message to a received message to protect sensitive information communicated between electronic devices, in accordance with an embodiment of the invention. At 1010, a message M (e.g., in the form of binary data) and a CRT key can be input. The CRT key can include variables such as p, q, dp=d mod(p−1), dq=d mod(q−1), d=e^(−1)mod(p−1)*(q−1), and Apq=p^(−1)mod q. At 1020, variable Sp can be calculated as Sp=M^dp mod p. At 1025, variable Sq can be calculated as Sq=M^dq mod q. At 1030, variable S can be calculated as S=((Sq−Sp)*Apq mod q)*p+Sp. At 1040, variable ep can be calculated as ep=1/dp mod(p−1).

At 1045, variable eq can be calculated as eq=1/dq mod(q−1). At 1050, variable Mp can be calculated as Mp=S^ep mod p. At 1055, variable Mq can be calculated as Mq=S^eq mod q. At 1060, variable M' can be calculated as M'=((Mq−Mp)*Apq mod q)*p+Mp. At 1070, a determination can be made as to whether M is equivalent to M'. If M is equivalent to M', then an infective value of S (i.e., S=S+Mp−(M mod p)+Mq−(M mod q)) can be provided as an output at 1080, in order to make an attacker's DFA greatest common devisor computation ineffective. If, however, it is determined at 1070 that M is not equivalent to M', then "error" can be provided as an output at 1090, in which the "error" can indicate that there was a fault in the exponentiation of the message data.

Figure 11:
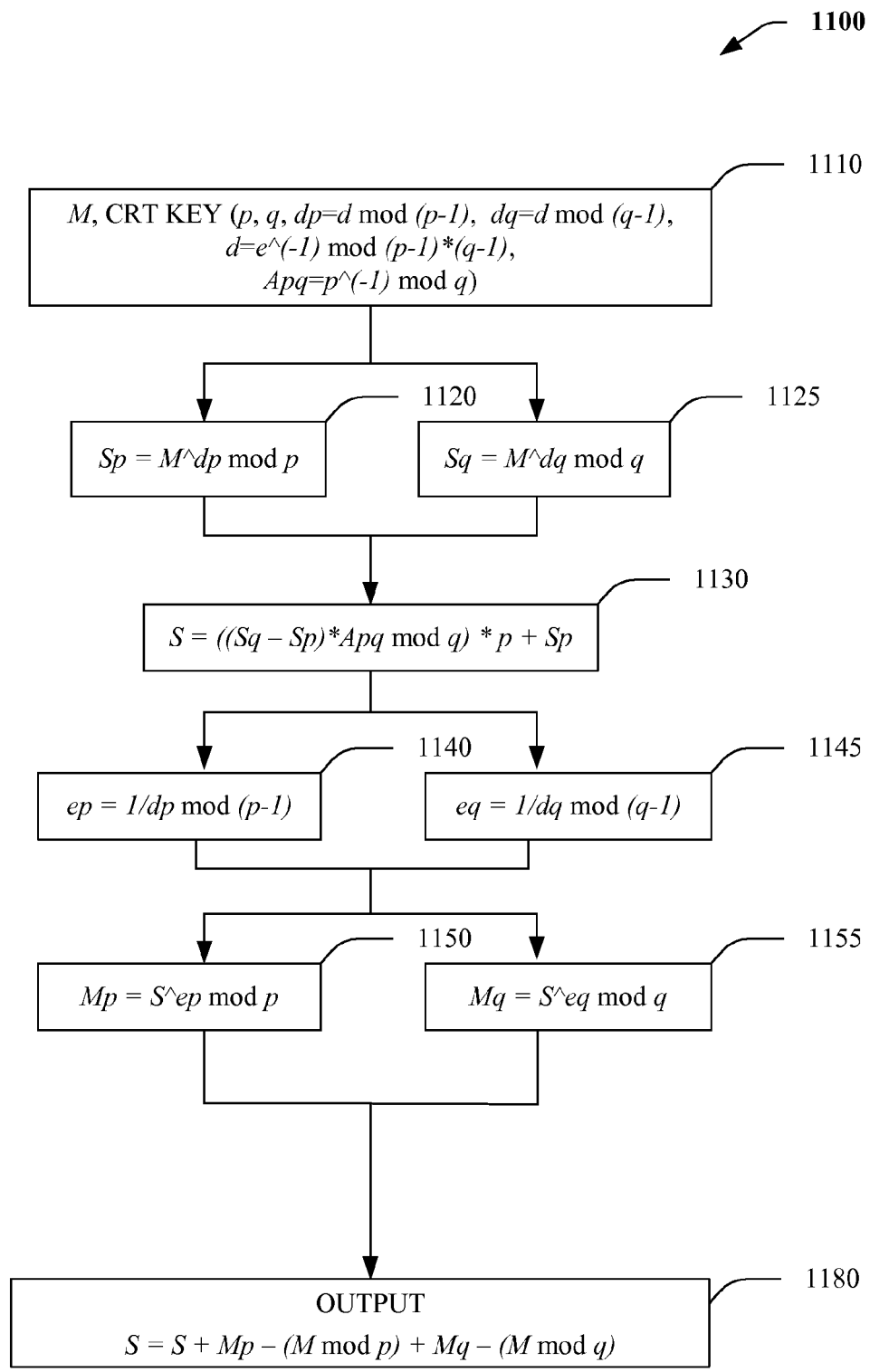
FIG. 11 is a flow chart illustrating performing an infective computation to protect sensitive information communicated between electronic devices, in accordance with an embodiment of the invention.

FIG. 11 is a flow chart illustrating performing an infective communication to protect sensitive information communicated between electronic devices, in accordance with an embodiment of the invention. At 1110, a message M (e.g., in the form of binary data) and a CRT key can be input. The CRT key can include variables such asp, q, dp=d mod(p−1), dq=d mod(q−1), d=e^(−1)mod (p−1)*(q−1), and Apq=p^(−1)mod q. At 1120, variable Sp can be calculated as Sp=M^dp mod p. At 1125, variable Sq can be calculated as Sq=M^dq mod q. At 1130, variable S can be calculated as S=((Sq−Sp)*Apq mod q)*p+Sp. At 1140, variable ep can be calculated as ep=1/dp mod(p−1).

At 1145, variable eq can be calculated as eq=1/dq mod(q−1). At 1150, variable Mp can be calculated as Mp=S^ep mod p. At 1155, variable Mq can be calculated as Mq=S^eq mod q. In order to make an attacker's DFA greatest common devisor computation ineffective, an infective value of S (i.e., S=S+Mp−(M mod p)+Mq−(M mod q)) can be provided as an output at 11180.

Figure 12:
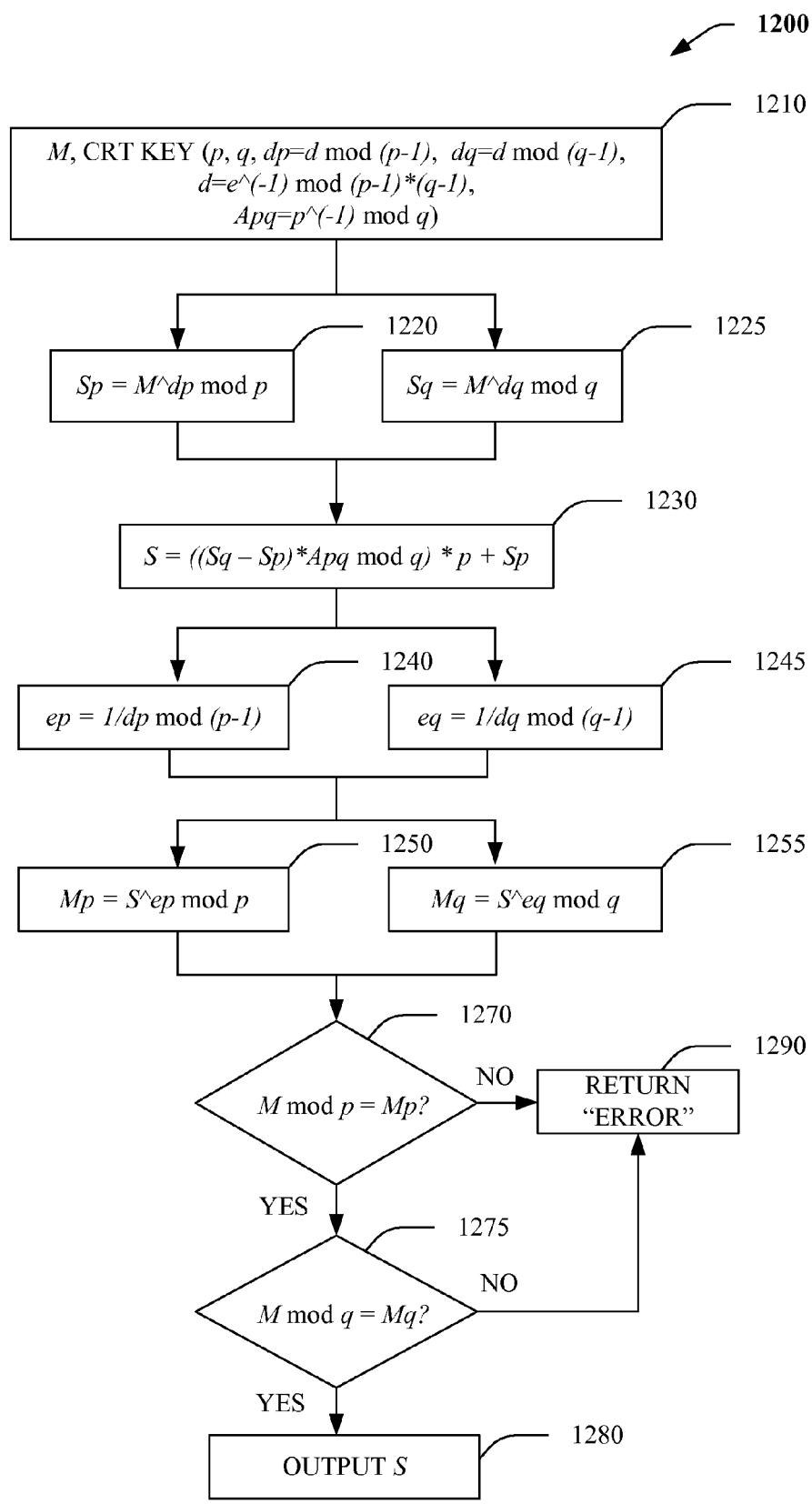
FIG. 12 is a flow chart illustrating performing modular exponentiations and determining whether the modular exponentiations are equivalent to public exponent derivations, in accordance with an embodiment of the invention.

FIG. 12 is a flow chart illustrating performing modular exponentiations and determining whether the modular exponentiations are equivalent to public exponent derivations, in accordance with an embodiment of the invention. At 1210, a message M (e.g., in the form of binary data) and a CRT key can be input. The CRT key can include variables such as p, q, dp=d mod(p−1), dq=d mod(q−1), d=e^(−1)mod(p−1)*(q−1), and Apq=p^(−1)mod q. At 1220, variable Sp can be calculated as Sp=M^dp mod p. At 1225, variable Sq can be calculated as Sq=M^dq mod q. At 1230, variable S can be calculated as S=((Sq−Sp)*Apq mod q)*p+Sp. At 1240, variable ep can be calculated as ep=1/dp mod (p−1).

At 1245, variable eq can be calculated as eq=1/dq mod(q−1). At 1250, variable Mp can be calculated as Mp=S^ep mod p. At 1255, variable Mq can be calculated as Mq=S^eq mod q. At 1270, a determination can be made as to whether M mod p is equivalent to Mp. If M mod p is equivalent to Mp, then a determination can be made at 1275 as to whether M mod q is equivalent to Mq. If M mod q is equivalent to Mq, then the value for S can be provided as an output at 1280. If, however, it is determined at 1270 that M mod p is not equivalent to Mp, or it is determined at 1275 that M mod q is not equivalent to Mq, then an "error" can be provided as an output at 1290, in which the "error" can indicate that there was a fault in the exponentiation of the message data.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., CD, DVD . . . ), smart cards, and flash memory devices (e.g., card, stick, key drive . . . ).

Further, it should be appreciated that a carrier wave can be employed to carry computer-readable electronic data such as those used in transmitting and receiving electronic mail or in accessing a network such as the Internet or a local area network ("LAN"). Of course, those skilled in the art will recognize many modifications may be made to this configuration without departing from the scope or spirit of the disclosed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 13:
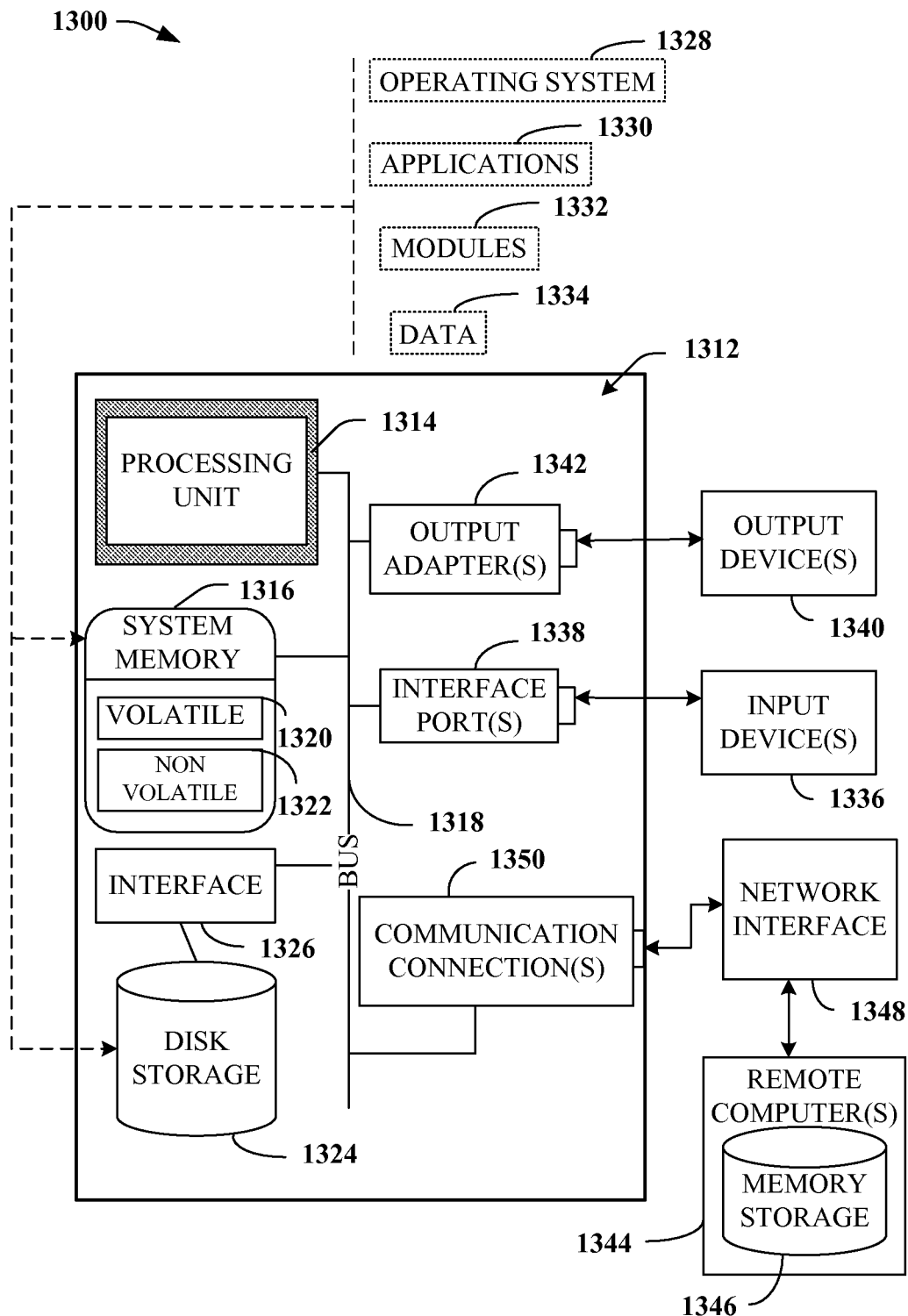
FIG. 13 is schematic block diagram illustrating a suitable operating environment.
Figure 14:
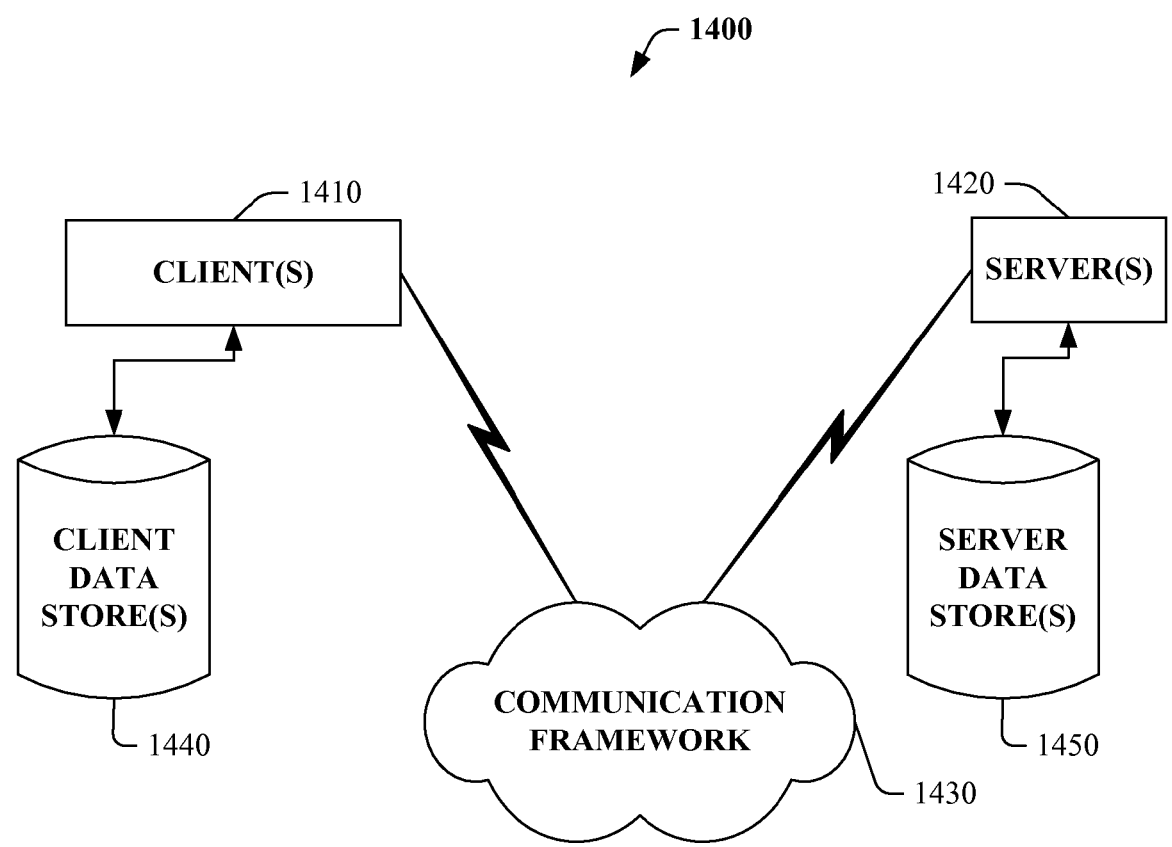
FIG. 14 is a schematic block diagram of a sample-computing environment.

In order to provide a context for the various aspects of the disclosed subject matter, FIGS. 13 and 14, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, a suitable environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture ("ISA"), Micro-Channel Architecture ("MSA"), Extended ISA ("EISA"), Intelligent Drive Electronics ("IDE"), VESA Local Bus ("VLB"), Peripheral Component Interconnect ("PCI"), Card Bus, Universal Serial Bus ("USB"), Advanced Graphics Port ("AGP"), Personal Computer Memory Card International Association bus ("PCMCIA"), Firewire ("IEEE 1394"), and Small Computer Systems Interface ("SCSI").

The system memory 1316 includes volatile memory 1320 and nonvolatile memory 1322. The basic input/output system ("BIOS"), containing the basic routines to transfer information between elements within the computer 1312, such as during start-up, is stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM ("DRAM"), synchronous DRAM ("SDRAM"), double data rate SDRAM ("DDR SDRAM"), enhanced SDRAM ("ESDRAM"), Synchlink DRAM ("SLDRAM"), Rambus direct RAM ("RDRAM"), direct Rambus dynamic RAM ("DRDRAM"), and Rambus dynamic RAM ("RDRAM").

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device ("CD-ROM"), CD recordable drive ("CD-R Drive"), CD rewritable drive ("CD-RW Drive") or a digital versatile disk ROM drive ("DVD-ROM"). To facilitate connection of the disk storage devices 1324 to the system bus 1318, a removable or non-removable interface is typically used, such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus ("USB"). Output device(s) 1340 use some of the same type of ports as input device(s) 1336.

Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks ("LAN") and wide-area networks ("WAN"). LAN technologies include Fiber Distributed Data Interface ("FDDI"), Copper Distributed Data Interface ("CDDI"), Ethernet, Token Ring and the like. WAN technologies include, but are not limited to, point-to-point links, circuit switching networks like Integrated Services Digital Networks ("ISDN") and variations thereon, packet switching networks, and Digital Subscriber Lines ("DSL").

Communication connection(s) 1350 refer(s) to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1420. Thus, system 1400 can correspond to a two-tier client server model or a multi-tier model (e.g., client, middle tier server, data server), amongst other models. The server(s) 1420 can also be hardware and/or software (e.g., threads, processes, computing devices). The servers 1420 can house threads to perform transformations by employing the subject innovation, for example. One possible communication between a client 1410 and a server 1420 may be in the form of a data packet transmitted between two or more computer processes.

The system 1400 includes a communication framework 1430 that can be employed to facilitate communications between the client(s) 1410 and the server(s) 1420. The client(s) 1410 are operatively connected to one or more client data store(s) 1440 that can be employed to store information local to the client(s) 1410. Similarly, the server(s) 1420 are operatively connected to one or more server data store(s) 1450 that can be employed to store information local to the servers 1420.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
at least one processor:
a memory communicatively coupled to the at least one processor, the memory having stored therein computer-executable instructions configured to implement the operating system including:
a cryptographic component configured to employ a Rivest, Shamir, and Adleman cryptographic technique and a Chinese Remainder Theorem to facilitate modular exponentiation of a received message,
wherein the cryptographic component is further configured to
perform a first modular exponentiation and a second modular exponentiation of the received message,
perform a Chinese Remainder Theorem calculation on the first modular exponentiation and the second modular exponentiation to recombine the first modular exponentiation and the second modular exponentiation to generate a result,
calculate a first sub-exponent as an inverse function of a first exponent and a second sub-exponent as an inverse function of a second exponent,
perform a first modular sub-exponentiation as a function of the first sub-exponent and the result, and perform a second modular sub-exponentiation as a function of the second sub-exponent and the result, and
perform a Chinese Remainder Theorem calculation on the first modular sub-exponentiation and the second modular sub-exponentiation to recombine the first sub-exponent and the sub-exponent to generate a sub-result; and
a verification component configured to compare the sub-result to the message to determine whether the sub-result matches the received message, present the result as an output if the sub-result equals the received message and present an error message as an output if the sub-result is not equal to the received message.

2. The system of claim 1, wherein the cryptographic component comprises:
an exponentiation component that is configured to perform the first modular exponentiation and the second modular exponentiation of the received message; and
a recombination component that is configured to perform a recombination associated with the received message utilizing Chinese Remainder Theorem computation as a function of the first modular exponentiation and the second modular exponentiation.

3. The system of claim 2, further comprising a modular exponentiation component that is configured to perform a first public exponent derivation and a second public exponent derivation as a function of a private exponent.

4. The system of claim 2, wherein the verification component is further configured to calculate the received message utilizing the Chinese Remainder Theorem computation.

5. The system of claim 3, wherein the verification component is further configured to reconstruct the received message as a function of the first public exponent derivation and the second public exponent derivation.

6. The system of claim 2, wherein the verification component is further configured to reconstruct the received message as a function of a public exponent.

7. The system of claim 5, wherein the verification component is further configured to at least one of perform a first modular exponentiation and determine whether a first modular exponentiation is equivalent to an exponentiation of the first public exponent derivation, or perform a second modular exponentiation and determine whether the second modular exponentiation is equivalent to an exponentiation of the second public exponent derivation.

8. The system of claim 5, wherein the verification component is further configured to perform an infective computation.

9. The system of claim 8, wherein the verification component is configured to perform the infective computation as a function of the received message being equivalent to the reconstructed received message.

10. The system of claim 1, wherein the verification component is configured to provide at least one of an output indicating "error" as a function of determining whether the received message is equivalent to the reconstructed received message, an output indicating "error" as a function of at least one of determining a first modular exponentiation is equivalent to an exponentiation of the first public exponent derivation or determining whether a second modular exponentiation is equivalent to an exponentiation of the second public exponent derivation, or an output indicating a signature.

11. A method comprising:
performing modular exponentiation of a received message in accordance with Rivest, Shamir, and Adleman cryptography and a Chinese Remainder Theorem, wherein the performing modular exponentiation of the received message further comprises performing a first modular exponentiation and a second modular exponentiation of the received message;
performing a Chinese Remainder Theorem calculation on the first modular exponentiation and the second modular exponentiation to recombine the first modular exponentiation and the second modular exponentiation to generate a result;
calculating a first sub-exponent based at least in part on an inverse of a first exponent and a second sub-exponent based at least in part an inverse of a second exponent;
performing a first modular sub-exponentiation as a function of the first sub-exponent and the result;
performing a second modular sub-exponentiation as a function of the second sub-exponent and the result;
performing a Chinese Remainder Theorem calculation on the first modular sub-exponentiation and the second modular sub-exponentiation to recombine the first sub-exponent and the sub-exponent to generate a sub-result;
determining whether to present the result as an output based at least in part on comparing the sub-result to the received message.

12. The method of claim 11, further comprising:
performing a recombination step as a function of the first modular exponentiation and the second modular exponentiation.

13. The method of claim 12, further comprising:
performing a first public exponent derivation and a second public exponent derivation as a function of a private exponent; and
reconstructing the received message as a function of the first public exponent derivation and the second public exponent derivation.

14. The method of claim 12, further comprising:
calculating the received message utilizing Chinese Remainder Theorem computation.

15. The method of claim 13, further comprising at least one of:
performing a first modular exponentiation and determining whether the first modular exponentiation is equivalent to an exponentiation of the first public exponent derivation; or
performing a second modular exponentiation and determining whether the second modular exponentiation is equivalent to an exponentiation of the second public exponent derivation.

16. The method of claim 12, further comprising at least one of:
performing an infective computation;
performing an infective computation as a function of the received message being equivalent to the reconstructed received message;
providing an output indicating "error" as a function of determining whether the received message is equivalent to the reconstructed received message;
providing an output indicating a signature; or
at least one of:
performing a first modular exponentiation and determining whether the first modular exponentiation is equivalent to an exponentiation of the first public exponent derivation, or
performing a second modular exponentiation and determining whether the second modular exponentiation is equivalent to an exponentiation of the second public exponent derivation.

17. The method of claim 11, further comprising:
calculating a variable Sp as Sp=M^dp mod p and calculating a variable Sq as Sq=M^dq mod q, where M is data associated with the received message, p and q are prime numbers, dp=d mod(p−1), dq=d mod(q−1), d=e^(−1) mod(p−1)*(q−1), and mod represents a modulo operation;
calculating a variable S as S=((Sq−Sp)*Apq mod q)*p+Sp, where Apq=p^(−1) mod q;
calculating a variable ep as ep=1/dp mod(p−1);
calculating a variable eq as eq=1/dq mod(q−1);
calculating a variable Mp as Mp=S^ep mod p, and calculating a variable Mq as Mq=S^eq mod q; and
calculating a variable Mp as Mp=S^e mod p and calculating a variable Mq as Mq=S^e mod q.

18. The method of claim 17, further comprising at least one of:
calculating a variable M'=((Mq−Mp)*Apq mod q)*p+Mp and determining whether the value of M' is equivalent to M;
determining whether the value of M mod p is equivalent to Mp;
determining whether the value of M mod q is equivalent to Mq; or
calculating a variable S as S=S+Mp−(M mod p)+Mq−(M mod q).

19. The method of claim 18, further comprising at least one of:
providing a variable S as an output;
providing "error" as an output if M' is not equivalent to M;
providing "error" as an output if M mod p is not equivalent to Mp; or
providing "error" as an output if M mod q is not equivalent to Mq.

20. A system comprising:
at least one memory to store instructions; and
at least one processor, coupled to the at least one memory, that facilitates execution of the instructions to perform operations, comprising:
performing module exponentiation of a received message using Rivest, Shamir, and Adleman cryptography and Chinese Remainder Theorem, wherein the performing modular exponentiation of the received message further comprises performing a first modular exponentiation and a second modular exponentiation of the received message;

calculating a first sub-exponent as an inverse function of a first exponent and a second sub-exponent as an inverse function of a second exponent;

performing a first modular sub-exponentiation as a function of the first sub-exponent and the result;

performing a second modular sub-exponentiation as a function of the second sub-exponent and the result;

performing a Chinese Remainder Theorem calculation on the first modular sub-exponentiation and the second modular sub-exponentiation to recombine the first sub-exponent and the sub-exponent to generate a sub-result;

comparing the sub-result to the received message to determine whether the sub-result matches the received message; and determining whether to present the result as an output based at least in part on comparing the sub-result to the received message.

* * * * *